Figure 1:
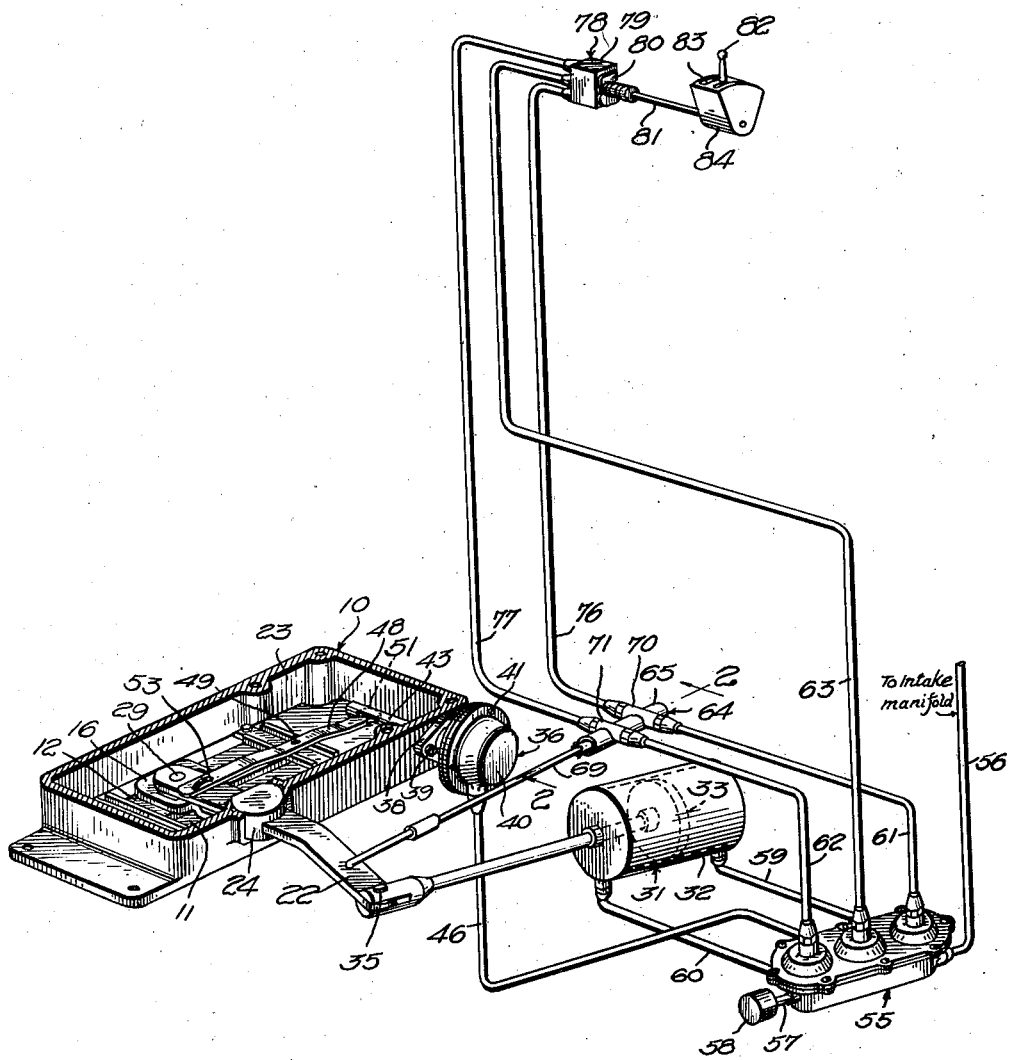

Feb. 4, 1941.  E. D. LASLEY  2,230,780
GEAR SHIFTING MECHANISM FOR MOTOR VEHICLES
Filed Oct. 17, 1936  3 Sheets-Sheet 1

Inventor
E. D. LASLEY
By
Attorney

Feb. 4, 1941.   E. D. LASLEY   2,230,780
GEAR SHIFTING MECHANISM FOR MOTOR VEHICLES
Filed Oct. 17, 1936   3 Sheets-Sheet 2

Inventor
E. D. LASLEY

Feb. 4, 1941.  E. D. LASLEY  2,230,780
GEAR SHIFTING MECHANISM FOR MOTOR VEHICLES
Filed Oct. 17, 1936   3 Sheets-Sheet 3

Inventor
E. D. LASLEY
Attorney

Patented Feb. 4, 1941

2,230,780

UNITED STATES PATENT OFFICE 2,230,780

GEAR SHIFTING MECHANISM FOR MOTOR VEHICLES

Edward D. Lasley, Detroit, Mich., assignor to Automatic Shifters, Inc., Richmond, Va., a corporation of Virginia Application October 17, 1936, Serial No. 106,215

12 Claims. (Cl. 74—334)

This invention relates to gear shifting mechanisms for motor vehicles.

Numerous types of fluid pressure devices have been proposed for effecting the shifting of the gears in a motor vehicle transmission. For example, in the prior patent of Edward G. Hill and Henry W. Hey, No. 2,030,838, granted February 11, 1936, there is shown and described a mechanism which is particularly effective for this purpose. Such mechanism is very efficient in operation and provides an extremely rapid shifting operation.

Mechanisms of the character referred to are effective for shifting the gears of a so-called "square" transmission, that is, a transmission in which all of the movements of the shift rods take place to an equal extent regardless of the gear position selected for operation. In some forms of transmissions, second and high gears are provided with synchronizing means, as is well known, and in such a transmission, movements of the second and high gear shift rod are shorter than the movements of the low and reverse gear shift rod. The latter shift rod is required to slide gears into and out of mesh, whereas the gears controlled by the second and high gear shift rod are in constant mesh and are controlled by synchronizing clutches.

In most shifting mechanisms, the difference in the distances of travel of the shift rods is of no importance. However, in the structure of the Hill and Hey patent referred to, one of the features of such mechanism is the "vacuum suspending" of the piston of the shifting motor in each gear position. This presents a problem of operation when the apparatus is used in connection with synchronizing transmissions of the character referred to. The operation of such a transmission is taken care of with the system of the patent referred to by using in conjunction therewith an auxiliary control valve which forms the subject matter of the copending application of Henry W. Hey, Serial No. 104,139, filed October 10, 1936.

An important object of the present invention is to provide a vacuum operated gear shifting mechanism having novel means for transmitting movement to the shift rods in such a manner as to compensate for the differences in the distances of movement of the shift rods, thus facilitating the "vacuum suspension" of the piston in its gear positions.

A further object is to provide novel means for transmitting movement from the piston or other pressure movable member of the shifting motor to the shift rods to compensate for difference in the distances of movement of such rods whereby a valve which controls vacuum suspension of the piston is moved the same distance for each gear position, thus facilitating the vacuum suspension of the piston.

A further object is to provide an apparatus of the character referred to wherein a lever is employed for transmitting movement to the transmission shift rods, and wherein the effective lever lengths of the lever are changed, depending upon the shift rod being actuated, to permit the valve referred to to move the same distance regardless of the selected gear, for the reason stated.

Other objects and advantages of the invention will become apparent during the course of the following description.

Figure 2:
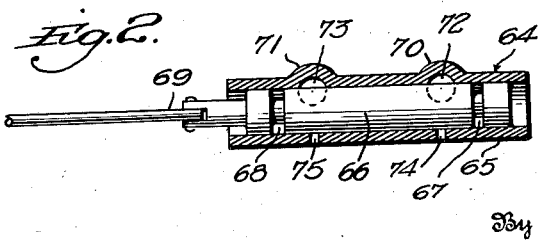
Figure 6:
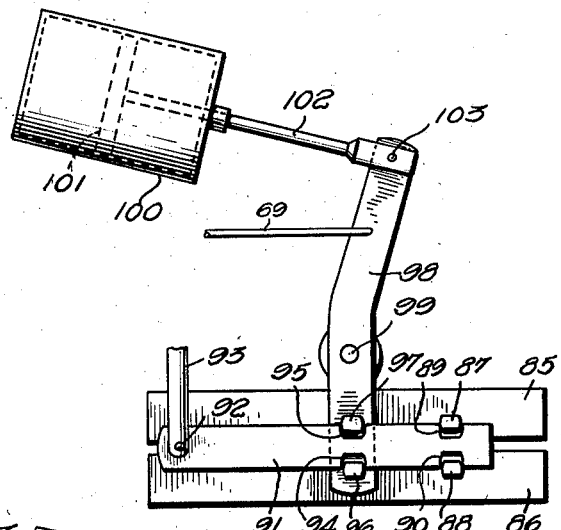
Figure 7:
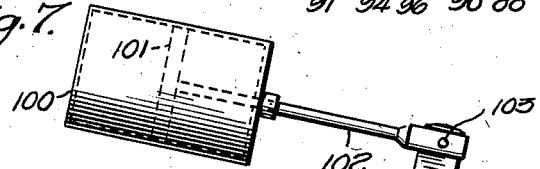
Figure 9:
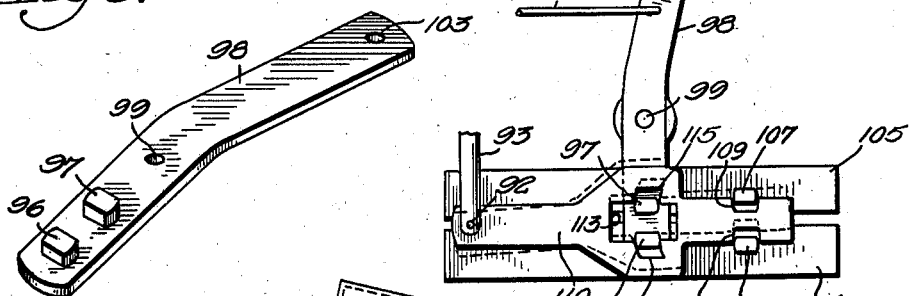
Figure 8:
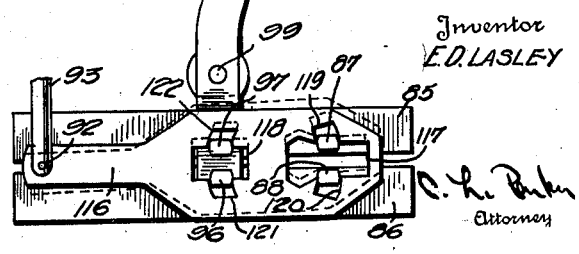

In the drawings I have shown several embodiments of the invention. In this showing:

Figure 1 is a perspective view of the shifting mechanism shown in connection with a portion of a motor vehicle transmission, parts being shown in section, Figure 2 is a detail section on line 2—2 of Figure 1, Figure 3 is a horizontal sectional view through the upper portion of the transmission showing one form of the invention applied, Figure 4 is a section on line 4—4 of Figure 3, Figure 5 is a detail perspective view of the shift rods and elements associated therewith, one of the elements being shown separated from its associated shift rod, Figure 6 is a plan view of the shifting motor, shift rods and associated elements, showing a modified form of the invention, Figure 7 is a similar view showing another modification of the invention, Figure 8 is a similar view of a further modified form of the invention, and, Figure 9 is a detail perspective view of the form of lever employed with the mechanisms of Figures 6, 7 and 8.

Referring to Figures 1, 3, 4 and 5, the numeral 10 designates a motor vehicle transmission as a whole having a pair of longitudinally shiftable rods 11 and 12 through which different gear positions are selected, these shift rods being provided with the usual depending forks (not shown) for effecting the shifting action. In the form of transmission in connection with which the present invention is adapted to be employed, the shift rod 11 is movable to select first and reverse gears, while the shift rod 12 is operable for selecting second and high gears, the latter gears being provided with synchronizing means which are operable while the gears remain in constant mesh. The operation of the shift rod 11 moves its associated gears into and out of mesh, and accordingly the shift rod 11 partakes of greater longitudinal movement into its gear positions than is true of the shift rod 12.

Referring to Figures 3, 4 and 5, it will be noted that the shift rod 12 is provided on its upper face with a boss or lug 14 having a recess 15 in the side thereof which faces away from the shift rod 11. The latter shift rod is provided with a plate 16 having a depressed foot portion 17 at one side thereof which is secured in any suitable manner to the shift rod 11. As shown in Figure 4, the foot 17 is riveted as at 18 and welded as at 19 to the shift rod 11, and accordingly is rigid therewith. The plate 16 overlies the lug 14 and is provided with a longitudinal slot 20 having a laterally offset notch 21 facing in the opposite direction to the opening of the notch 15.

A lever 22 is adapted to effect the shifting of the rods 11 and 12, and this lever is preferably supported by the cover 23 of the transmission. Referring to Figures 3 and 4 it will be noted that the lever 22 has its inner end extending through a cylindrical rocking member 24 mounted in the side wall of the cover 23 to rock on a vertical axis, suitable packing 25 being provided to prevent the leakage of lubricant around the rocking member 24. The lever 22 is adapted to rock on the axis of the member 24 and is also longitudinally slidable therein, the rocking member being provided with packing 26 for the same purpose as the packing 25. It will be noted that the recess in which the rocking member 24 is arranged is cylindrical and is closed at the top by a threaded cap 27, as shown in Figure 4. Suitable packing 28 also may be arranged above and below the rocker 24 to prevent the escape of lubricant from the transmission.

The inner end of the lever 22 is provided with a depending lug 29 which may be formed integral with the lever 22 or threaded thereinto as at 30. Upon longitudinal sliding movement of the lever 22 through the rocker 24, the lug 29 may be selectively engaged in the notches 15 and 21. In Figure 4 of the drawings the lug 29 is shown engaged in the notch 21, being completely disengaged from the notch 15, whereby rocking movement of the lever 22 will effect shifting movement of the rod 11. When the parts of the apparatus are in neutral position, the lever 22 is adapted to slide to the right as viewed in Figures 3 and 4 to arrange the lug 29 in the notch 15, whereupon rocking movement of the lever 22 will effect movement of the shift rod 12.

A fluid pressure motor indicated as a whole by the numeral 31 is adapted to swing the lever 22 about its vertical pivot axis. This motor comprises a cylinder 32 having a piston 33 reciprocable therein and provided with a piston rod 34 pivotally connected at its free end to the lever 22, as at 35. For installation reasons, the cylinder 32 is angularly arranged outwardly of the transmission, as shown in Figure 3, and the outer end of the lever 22 is preferably angularly arranged at an angle of 90 degrees to so as to be disposed at the transmission is in the piston rod 34 when the transmission is in neutral position. This arrangement is employed in order that the angle between the outer end of the lever 22 and the piston rod 34 will be equal in different gear positions, as will be obvious.

It will be apparent that energizing the motor 31 will effect movement of either rod 11 or 12, depending upon which rod has been selected for operation, and a crossover motor is employed for selecting the shift rods for operation. The crossover motor is shown in Figures 1 and 3 and is indicated as a whole by the numeral 36. This motor comprises an inner casing 37 having a flange 38 attached to the side of the transmission by screws 39. The crossover motor also comprises an outer casing 40 secured to the casing 37 by screws 41 with a flexible diaphragm 42 clamped between the two casings.

The diaphragm 42 is provided with a shaft 43 which is reciprocable in a bearing 44 forming a part of the casing 37. A spring 45 biases the diaphragm 42 toward the left as viewed in Figure 3, and a pipe 46, controlled in a manner to be described, is adapted to connect the interior of the casing 40 to a source of vacuum to effect movement of the diaphragm 42 toward the right as viewed in Figure 3. The casing 37 is vented to the atmosphere as at 47 to set up differential pressure on opposite sides of the diaphragm 42 to effect the movement referred to, when the pipe 46 is connected to a source of vacuum.

A crossover lever 48 is arranged within the cover 23 and is pivotally supported by a pivot pin 49 projecting through a lug 50 carried by the cover plate 23. One end of the lever 48 is provided with a reduced rounded end 51 operating in a slot 52 formed in the inner end of the shaft 43. The other end of the lever 48 is provided with an arcuate slot 53 receiving an upstanding pin 54 carried by the lever 22. The slot 53 is approximately concentric with the axis of the rocking member 24 when the gears are arranged in neutral, as shown in Figure 3. It will be apparent that rocking movement of the lever 48 is adapted to slide the lever 22 to arrange the lug 29 in either of the notches 15, and that the slot 53 permits the rocking of the lever 22 for transmitting movement to the selected shift rod.

Control valve devices are employed for controlling the operation of the motors 31 and 36, and such devices may be of the type disclosed in the prior Patent No. 2,030,838 referred to above. The main control valve mechanism is indicated as a whole by the numeral 55, and this valve mechanism is connected to the intake manifold of the vehicle engine through a pipe 56, and to the atmosphere through a pipe 57, preferably having an air cleaner 58 connected thereto. The mechanism 55 includes a pair of valves (not shown) which are operative for connecting the ends of the cylinder 32 to the intake manifold or the atmosphere through pipes 59 and 60. The valves which control these pipes are, in turn, controlled in accordance with the admission of air into a pair of pipes 61 and 62 respectively. The mechanism 55 is further provided with a third valve, (not shown) which controls the connection of the crossover motor casing 40 to the atmosphere or the intake manifold through the pipe 46, previously described. The third valve of the mechanism 55 is controlled in turn, in accordance with the admission of air into a pipe 63 leading to the mechanism 55.

The pipes 61 and 62 lead to the auxiliary valve device indicated as a whole by the numeral 64. This device comprises a tubular valve casing 65 in which is arranged a valve 66 provided adjacent its opposite ends with grooves 67 and 68 respectively. The valve 66 is actuated by a stem 69, the free end of which is connected to the outer end of the lever 22, as shown in Figure 1.

The valve casing 65 is provided with a pair of integral transverse extensions 70 and 71 having passages 72 and 73 therethrough connected to the respective pipes 61 and 62. The bottom of the valve casing 65 is provided with atmospheric ports 74 and 75 arranged in the respective vertical planes of the passages 72 and 73. It will become apparent that in one set of gear positions, the groove 67 registers with and affords communication between the passage 72 and port 74, while the groove 68 serves the same function in connection with the passage 73 and port 75 in the other set of gear positions.

Pipes 76 and 77 are connected to the other ends of the respective valve casing extensions 70 and 71 in communication with the respective passages 72 and 73. The admission of air into the pipes 63, 76 and 77 is controlled by a selector valve mechanism indicated as a whole by the numeral 78. This selector valve mechanism is completely disclosed in Patent No. 2,030,838, referred to above. The selector valve per se comprises a valve casing 79 having a pair of passages therethrough communicating with the respective pipes 76 and 77, and these passages are adapted to be selectively opened to the atmosphere upon the rocking of a valve 80. This valve is mounted on a shaft 81 which rocks to transmit turning movement to the valve 80. The shaft 81 is also adapted to slide longitudinally toward the left as viewed in Figure 1 to open the pipe 63 to the atmosphere through suitable passages of the valve casing 79. The shaft 81 is provided with an operating handle 82 operated in an H-slot 83 formed in the arcuate upper face of a segmental housing 84.

In the form of the invention previously described, the lever 22 is adapted to partake of both rocking and sliding movement, and in Figures 6, 7 and 8 of the drawings, modifications of the apparatus are shown in which the shifting lever rocks on a fixed vertical axis without partaking of any sliding movement. Referring to Figure 6, the numeral 85 designates the first and reverse gear shift rod, and the numeral 86 designates the second and high gear shift rod. These rods are respectively provided with upstanding lugs 87 and 88 engageable in notches 89 and 90, respectively, formed in opposite edges of a crossover lever 91. These notches are formed adjacent one end of the lever 91, and the opposite end of this lever is connected as at 92 to the shaft 93 of a suitable crossover motor, such as the motor 36 previously described.

Intermediate its ends, the lever 91 is further provided in its opposite edges with notches 94 and 95, respectively engageable with lugs 96 and 97 carried by a shifting lever 98. This lever partakes of rocking movement about a fixed vertical pivot 99. The shifting motor for the lever 98 may correspond to the motor 31, and is shown as comprising a cylinder 100 having a reciprocable piston 101 therein provided with a piston rod 102 pivotally connected at its outer end as at 103 to the free end of the lever 98.

It will be apparent that if the crossover motor 36 is used in the form shown in Figure 3, the shaft 93 in Figure 6 will be biased downwardly as viewed in such figure, in which case the first and reverse shift rod 85 will be biased for actuation. This obviously reverses the relative positions of the selector handle 82 with respect to conventional practice. Obviously, the operation of the apparatus is not interfered with in any way under such conditions, and conventional shifting may be provided by either of a number of simple expedients. For example, the crossover motor may be changed over to the other side of the transmission, or the biasing spring 45 and pipe 46 may be changed over to the motor casing 37 with the casing 40 vented to the atmosphere.

The form of the invention shown in Figure 7 may be used where the relative positions of the shift rods are reversed. In this form of the invention, the first and reverse gear shift rod is indicated by the numeral 104 and a second and high gear shift rod is indicated by the numeral 105. These rods are respectively provided with lugs 106 and 107 which are respectively engageable in notches 108 and 109 formed in opposite edges of a crossover lever 110. The notches 108 and 109 are formed adjacent one end of the crossover lever. The other end of this lever is provided with crossover means as in the previous forms of the invention, the lever being pivotally connected as at 92 to the shaft 93 of a crossover motor which may be identical with the motor 36.

Instead of being provided with notches in its edges corresponding to the notches 94 and 95, the lever 110 is provided with a relatively large opening 113 intermediate its ends, and this opening is provided in opposite edges with notches 114 and 115 respectively. The shift lever and associated parts may be the same as in the form of the invention shown in Figure 6, and such parts have been indicated by the same reference numerals. It will be apparent that the notches 114 and 115 are respectively engageable with the lugs 96 and 97 of the shifting lever 98.

In the form of the invention shown in Figure 8 most of the parts are identical in construction with the corresponding parts in Figure 6 and have been indicated by the same reference numerals. In Figure 8, however, a different crossover lever structure has been employed, and such lever has been indicated by the numeral 116. The lever 116 is relatively wide at one end and is provided with a pair of openings 117 and 118. The opening 117 is provided in opposite edges with notches 119 and 120 respectively engageable with lugs 87 and 88 of the shift rod. The opening 118 is provided in opposite edges with notches 121 and 122 respectively engageable with the lugs 96 and 97 of the shift lever 98. The crossover motor employed with the device shown in Figure 8 may be identical with the motor 36. As previously stated, the same shifting lever may be used with the forms of the invention shown in Figures 6, 7 and 8, and such lever is illustrated in perspective in Figure 9. It also will be apparent that the shifting motors of all of the modified forms of the invention are the same as the shifting motor 31 and the cylinders of these motors will be provided with pipes corresponding to the pipes 59 and 60.

The operation of the form of the invention shown in Figures 1 to 5 inclusive is as follows:

So far as the controlling of the various parts of the apparatus is concerned, the mechanism functions in accordance with the disclosure of the Hill and Hey Patent No. 2,030,338, referred to above. When low gear is to be selected for operation, the selector handle 82 is moved toward the left and then rearwardly in the H-slot 83. The movement of the handle 82 to the left slides the shaft 81 and opens the ports which connect the pipe 63 to the atmosphere. One of the valves of the mechanism 55 is thus actuated and connects the pipe 46 and the crossover motor casing 40 to the intake manifold, thus establishing differential pressure on opposite sides of the diaphragm 42 (Figure 3) to move this diaphragm to the right. This action swings the crossover motor 48 in a counter-clockwise direction, as viewed in Figure 3, thus sliding the inner end of the lever 22 toward the left. Thus the lug 29 of the shift lever will be moved into engagement with the notch 21, and it will be noted that this notch is formed in the plate 16 which is connected to the low and reverse gear shift rod 11.

Rearward movement of the handle 82 to the low gear position rocks the valve 80 to admit air into the pipe 77 while retaining the pipe 76 closed to the atmosphere. The air admitted into the pipe 77 flows through the passage 73 (Figure 2) and pipe 62 into the valve mechanism 55, thus actuating the valve which controls the pipe 60. Under the conditions referred to, the pipe 60 will be connected to the intake manifold while the pipe 59 remains in communication with the atmosphere, thus connecting the rear or left hand end of the cylinder 32 (Figure 1) to the intake manifold while retaining the connection of the right hand or forward end of the cylinder 32 with the atmosphere.

Thus the piston 33 will move rearwardly or to the left as viewed in Figure 1, thus swinging the outer end of the lever 22 rearwardly, and the inner end of this lever forwardly, and forward movement accordingly will be transmitted to the shift rod 11 to place the gear set in low gear. It will be apparent that reverse gear may be selected by moving the selector handle 82 to the left and forwardly, under which conditions the crossover motor will be controlled in the same manner as for low gear. However, air will be admitted into the pipe 76 by the selector valve 80, instead of into the pipe 77, and the forward or right hand end of the cylinder 37, as viewed in Figure 1, will be connected to the intake manifold to shift the rod 11 rearwardly.

Second gear may be selected by moving the handle 82 to the right and forwardly in which case the pipe 63 will be cut off from the atmosphere by the shaft 81, and the corresponding valve of the mechanism 55 will open the pipe 46 to the atmosphere to balance pressures on opposite sides of the diaphragm 42 (Figure 3). The spring 45 will then move the diaphragm 42 to its biased position, thus swinging the lever 48 in a counter-clockwise direction. This operation, through the slot 53 and pin 54, slides the lever 22 to the right to engage the lug 29 in the notch 15. Thus the second and high gear shift rod 12 will be selected for operation, it being apparent from Figure 5 that the notch 15 is formed in the lug 14 carried by the shift rod 12.

Forward movement of the selector handle 82 admits air into the pipe 76, and this air flows through passage 72 (Figure 2) and pipe 61 to operate one of the valves of the mechanism 55 and connect the pipe 59 to the intake manifold. At the same time the pipe 60 will remain in communication with the atmosphere, and the piston 33 will move forwardly, or to the right as viewed in Figure 1. Forward movement of the piston 33 transmits similar movement to the outer end of the lever 22, and the inner end of this lever moves rearwardly whereby the lug 29 transmits rearward movement to the shift rod 12 to place the gear set in second gear. The operation for placing the gear set in high gear is carried out in a similar manner, the selector handle 82 being moved to the right and rearwardly, thus opening the pipe 77, passage 73 and pipe 62 to the atmosphere. The rear end of the cylinder 31 thus will be connected to the intake manifold and the piston 33 will move rearwardly to transmit forward movement to the shift rod 12.

The general operation referred to corresponds to the operation of the mechanism disclosed in Patent No. 2,030,838, except for the specific lever means for transmitting movement from the motors 31 and 36 to select and shift the desired shift rods. In accordance with the disclosure of the patent referred to, it is highly desirable when the piston 33 is moved to one end of the cylinder to effect the shift to a given gear position, that the opposite end of the cylinder 32 be connected to the source of vacuum to "vacuum suspend" the piston. This operation is highly desirable since the next operation of the piston may take place by admitting air into one end of the cylinder while retaining the other end in communication with the source of vacuum, the operation under such conditions being carried out with extreme rapidity. This operation is provided in the patent referred to, but the mechanism of the patent is designed for use in connection with a so-called "square" transmission wherein the different movements of the two shift rods are equal. Therefore, the piston of the shifting motor may be vacuum suspended after moving a given distance in either direction from neutral position. With a transmission of the type employing synchronizing means in connection with second and high gears, the shift rods move different distances and such different distances of travel must be compensated for in order to provide the feature of vacuum suspension referred to.

In the structure of the patent, one end of the cylinder of the shifting motor is connected to the intake manifold by opening to the atmosphere one or the other of a pair of pipes corresponding to the pipes 76 or 77, and when a gear position is reached, the other end of the cylinder is connected to the intake manifold by connecting to the atmosphere one or the other of a pair of passages corresponding to the passages 72 and 73 of the auxiliary valve device 64. As stated, such operation is wholly practicable for use in connection with "square transmissions."

In transmissions having synchronizing means associated with second and high gears, a valve in an apparatus of this character corresponding to the valve 66 ordinarily moves different distances according to the distance of travel of the shift rod being actuated. In the copending application of Henry W. Hey, Serial No. 104,139, filed October 10, 1936, there is disclosed an auxiliary valve similar to the valve 64, which is operative for effecting vacuum suspension of the piston of the shifting motor with synchronizing transmissions of the character referred to. The present invention is designed to accomplish the same result by changing the effective shifting leverages in accordance with the shift rod being actuated, so that the outer end of the lever 22 will swing through the same arcuate path regardless of the gear ratio being selected.

Referring to Figures 3, 4 and 5, it will be noted that in a synchronizing transmission of the character referred to, the shift rod 11 moves a greater distance that the shift rod 12, the former being required to move a sufficient distance to mesh and unmesh certain gears, the latter being required to move a shorter distance to render operative the synchronizing means associated with second and high gears. It also will be noted that the notch 21, through which motion is transmitted to the shift rod 11, is located a longer distance from the axis of the rocker 24 than the notch 15, through which motion is transmitted to the shift rod 12. The lug 29 is fixed to the inner end of the lever, but the effective lever lengths of the ends of this lever are changed upon sliding movement of the lever incident to operation of the crossover motor. When the lug 29 is moved into engagement with the notch 21, the length of the inner end of the lever 22 is increased, while the length of the outer end of this lever is decreased. Conversely, when the lug 29 is moved into engagement with the notch 15, the lengths of the inner and outer ends of the lever 22 are respectively decreased and increased.

Accordingly it will be apparent that for approximately a given swinging movement of the outer end of the lever 22, the shift rod 11 will be moved a greater distance than the shift rod 12. By embodying the features of the structure shown, therefore, the operating mechanism readily may be designed so that the point on the outer end of the lever 22 at which the valve 66 is connected thereto travels exactly the same distance when shifting into the different gear ratios. Similarly, by properly designing the parts of the device, the point of connection of the valve operating rod 69 to the lever 22 may be made at a point adjacent the pivotal connection 35, in which case the piston 33 will move approximately the same distance for any selected gear ratio. When any gear position 33 is reached, therefore, one or the other of the grooves 67 or 68 will admit air into its associated passage 72 or 73 through the corresponding port 74 or 75. This operation provides vacuum suspension of the piston 33. Thus the present apparatus provides all of the advantages of the structure of the patent referred to, and renders such structure applicable to transmissions wherein the shift rods travel different distances.

The operation of the forms of the invention shown in Figures 6, 7 and 8 are similar in principle to the form previously described. The principal distinction between the two types of lever mechanisms lies in the fact that in the form previously described a shift lever partakes of bodily movement to effect the change in the lever lengths, whereas in the forms of the invention shown in Figures 6, 7 and 8, the shift lever turns about a fixed axis and has its effective lever lengths controlled by the shifting of the respective crossover levers 91, 110 and 116.

In Figure 6 of the drawings it will be apparent that when the crossover motor associated with the shaft 93 operates to move this shaft upwardly, the lever 91 will be rocked to move the notch 95 into engagement with the lever lug 97, and to bring the notch 90 into engagement with the lug 88. The lug 97 thus transmits movement to the shift rod 86, upon actuation of the piston 101 of the shift motor. According to the direction of movement of this piston, therefore, the gear set will be placed in second or high gear. Opposite movement of the crossover motor moves the notch 94 into engagement with the lug 96 while the notch 89 will be swung into engagement with the lug 87. Actuation of the shift motor will then transmit movement to the first and reverse gear shift rod 85 depending upon the direction of movement of the piston 101. Since the lug 96 is materially further from the axis 99 of the shifting lever than the lug 97, it will be apparent that a given swinging movement of the outer end of the shift lever will move the shift rod 85 a greater distance than is true when motion is transmitted to the shift rod 86. By locating the lugs 96 and 97 at the proper points with respect to the pivot axis 99, the necessary movement may be transmitted to provide a relatively long movement of the shift rod 85 and a shorter movement to the shift rod 86, with the valve 66 moving the same distance in any case. Thus the vacuum suspension of the piston of the shifting motor is facilitated.

The form of the invention shown in Figure 7 is provided for transmissions in which the relative positions of the two shift rods are reversed. For example, if the shift rod 104 is the first and reverse gear shift rod, it is necessary for a transmission of the character referred to to move this shift rod to a greater extent than the second and high gear shift rod 105. Upon upward movement of the crossover motor shaft 93, the notch 114 will be moved into engagement with the lug 96, while the lug 108 will be moved into engagement with the lug 106. The notches at the same side of the crossover lever thus will be effective for transmitting the shifting action upon movement of the piston 101. Similarly, when the shaft 93 moves downwardly the notches 115 and 107 will be brought into engagement with the respective lugs 97 and 109 which arrangement selects the shift rod 105 for actuation. Since the lug 97 is closer to the axis 99 than the lug 96, movement of the piston 101 to move the valve 66 a given distance transmits a shorter motion to the shift rod 105 than to the shift rod 104, and the parts are designed so that the piston 101 moves to effect the proper shifting of either shift rod while moving the valve 66 the same distance in opposite directions from its neutral position.

For structural reasons the form of the invention shown in Figure 8 may be adopted in place of the form shown in Figure 6, the functioning of the two devices being generally similar. Upward movement of the shaft 93 brings the lugs 87 and 96 into engagement with the respective notches 119 and 121, whereupon operation of the shifting motor actuates the first and reverse gear shift rod 85. Similarly, downward movement of the shaft 93 brings the lugs 88 and 97 into engagement with the respective notches 120 and 122, whereupon actuation of the shifting motor transmits movement to the second and high gear shift rod 86. Such operation obviously is the full equivalent of the operation of the form of the invention shown in Figure 6, and it will be apparent that with the valve 66 and rod 69 moving the same distance from the neutral intermediate position, the desired movement of the shift rods may be effected, the lug 97 being closer to the pivot axis 99 than the lug 96 to transmit shorter movements to the shift rod 86 than to the rod 85.

From the foregoing it will be apparent that the present invention contemplates the provision of mechanical means for compensating for differences in the distances of travel of the shift rods of a transmission in which only one of the shift rods controls gears which are provided with synchronizing means, thus permitting the shifting motor to move the shift rods to cause the latter to move different distances, while effecting equal movements of the control device or valve which provides the vacuum suspension of the motor piston. Thus the vacuum suspension of the piston in either of its gear positions is provided.

I claim:

1. Gear shifting mechanism for a motor vehicle transmission having shifting members movable different distances to provide different gear ratios, means connectible with said shifting members for selectively actuating said shifting members, means including a motor rendering said actuating means operative for moving said shifting members different distances in accordance with the distances of travel of said shifting members necessary to provide the different gear ratios, and a control device connected to control energization of said motor and connected to said actuating means to be moved thereby the same distance regardless of the distance of travel of the shifting member selected for actuation.

2. Gear shifting mechanism for a motor vehicle transmission having shifting members movable different distances to provide different gear ratios, means arranged for selecting said members for actuation, means including a motor for actuating the selected shifting member, said selecting means controlling said actuating means to cause the latter to move said shifting members different distances in accordance with the distances necessary for said shifting members to move to provide the gear ratios controlled thereby, and a control device connected to control energization of said motor and movable by said actuating means the same distance regardless of the distance of travel of the shifting members selected for actuation.

3. Gear shifting mechanism for a motor vehicle transmission having shifting members movable different distances to provide different gear ratios, a lever connectible with said shifting members for selectively actuating said shifting members, means for varying the movement transmitted from said lever to said shifting members to move the latter different distances in accordance with the distance of travel necessary to provide different gear ratios, a motor connected to said lever, and a control device connected to control said motor and connected to said lever to be moved thereby the same distance regardless of the distance of travel of the selected shifting member.

4. Gear shifting mechanism for a motor vehicle transmission having shifting members movable different distances to provide different gear ratios, means arranged for selecting said members for actuation, a lever for actuating the selected shifting member, said selecting means being operable for controlling the transmission of movement from said lever to said shifting members to move the latter different distances in accordance with the distance of travel necessary to provide different gear ratios, said lever having one point in its length movable the same distance regardless of the distance of travel of the selected shifting member, a motor connected to said lever, and a control device connected to control said motor and having a movable member connected to said lever at said point.

5. Gear shifting mechanism for a motor vehicle transmission having shifting members movable different distances to provide different gear ratios, a lever pivoted intermediate its ends and having one end operative for selectively actuating said shifting members, means for varying the movement transmitted from said end of said lever to said shifting members in accordance with the distance of travel of said shifting members necessary to provide different gear ratios, power means for operating the other end of said lever, the last named end of said lever having a point therein movable the same distance regardless of the distance of travel of the selected shifting member, and a control device for said power means operable by said lever and connected to said lever at said point.

6. Gear shifting mechanism for a motor vehicle transmission having shifting members movable different distances to provide different gear ratios, a lever mounted for bodily movement and for swinging movement about a fixed axis, selecting means operable for bodily moving said lever to engage one end thereof with either of said shifting members and operable for changing the effective length of said end of said lever in accordance with the shifting member selected for actuation, power means connected to the other end of said lever for swinging the latter about said axis, the last named end of said lever having a point therein movable the same distance regardless of the distance of movement of the selected shifting member, and a control device for said power means connected to said lever at said point.

7. Gear shifting mechanism for a motor vehicle transmission having shifting members movable different distances to provide different gear ratios, a lever mounted for swinging movement about a fixed axis and longitudinally movable with respect to such axis, said shifting members having recesses engageable by one end of said lever, the recess of the shifting member which is movable the greater distance being closer to said pivot axis than the other recess, means for moving said lever longitudinally to engage said end thereof in either of said recesses, power means connected to the other end of said lever to swing it about said axis, the last named end of said lever having a point therein movable the same distance regardless of the distance of travel of the selected shifting member, and a control device for said power means connected to said lever at said point.

8. Gear shifting mechanism for a motor vehicle transmission having shifting members movable different distances to provide different gear ratios, a pivoted lever, a floating lever engageable with the respective shift rods and with said first named lever at points arranged respectively different distances from the pivot point thereof, means for actuating said floating lever to move it to either of two operative positions engaging said first named lever and one of said shift rods to transmit movement to the latter through the distance of travel necessary to provide the gear ratios controlled thereby, power means for actuating said first named lever, such lever having a point therein movable the same distance regardless of the shifting member selected for actuation, and a control device for said power means connected to said lever at said point.

9. Gear shifting mechanism for a motor vehicle transmission having shifting members movable different distances to provide different gear ratios, a lever pivoted intermediate its ends, a floating lever having portions respectively engageable with said shift rods, said levers being provided with interengaging lugs and recesses whereby swinging movement of said first named lever transmits movement to said shift rods, the points of engagement between said levers being arranged different distances from the pivot of said first named lever to vary the effective length of the latter in accordance with the distance of travel of the selected shift rod, power means connected to the other end of said first named lever, such lever having a point therein movable the same distance regardless of the distance of travel of the selected shift rod, and a control device for said power means connected to said first named lever at said point.

10. Gear shifting mechanism for a motor vehicle transmission having shifting members movable different distances to provide different gear ratios and each provided with a lug, a pivoted lever having a pair of lugs spaced different distances from the pivot thereof, a floating lever having recesses selectively engageable with said lever lugs and being further provided with a pair of recesses respectively engageable with the lugs of said shifting members, means for moving said floating lever to engage one of said first named recesses with the lever lug closer to the pivot of said first named lever with one of said last named recesses engaging the lug of the shifting member which moves the greater distance, and power means for operating said first named lever.

11. Gear shifting mechanism for a motor vehicle transmission having shifting members movable different distances to provide different gear ratios and each provided with a lug, a pivoted lever having a pair of lugs spaced different distances from the pivot thereof, a floating lever having recesses selectively engageable with said lever lugs and being further provided with a pair of recesses respectively engageable with the lugs of said shifting members, means for moving said floating lever to engage one of said first named recesses with the lever lug closer to the pivot of said first named lever with one of said last named recesses engaging the lug of the shifting member which moves the greater distance, power means for operating said first named lever, said first named lever having a point therein movable the same distance regardless of the distance of movement of the selected shift member, and a control device connected to said lever at said point.

12. Gear shifting mechanism for a motor vehicle transmission having shifting members movable different distances to provide different gear ratios, a lever for selectively actuating said shifting members, said lever having a point therein movable the same distance regardless of the difference of travel of the selected shifting member, a differential pressure motor having a movable member connected to said lever, means for connecting one end of said motor to a source of pressure differential, and an auxiliary valve for connecting the other end of said motor to said source, said auxiliary valve being connected to said lever at said point to connect the other end of said motor to said source when the selected shifting member reaches a gear position regardless of the distance of travel of such shifting member.

EDWARD D. LASLEY.